[11] 3,621,180

| [72] | Inventor | William Rolff |
| | | Carlstadt, N.J. |
| [21] | Appl. No. | 830,058 |
| [22] | Filed | June 3, 1969 |
| [45] | Patented | Nov. 16, 1971 |
| [73] | Assignee | Singer-General Precision Inc. |
| | | Little Falls, N.J. |

[54] SYSTEM FOR CORRECTING UNBALANCES ON A ROTATING MASS
2 Claims, 1 Drawing Fig.

| [52] | U.S. Cl. | 219/121 |
| [51] | Int. Cl. | B23k 9/00 |
| [50] | Field of Search | 73/66; 219/121, 69 |

[56] References Cited
UNITED STATES PATENTS

| 2,322,561 | 6/1943 | Bevins et al. | 219/69 |
| 2,346,975 | 4/1944 | Laboulais | 219/69 |
| 3,259,730 | 7/1966 | Wehde et al. | 219/121 |
| 3,469,076 | 9/1969 | Saslawsky | 219/121 |
| 3,472,998 | 10/1969 | Popick et al. | 219/121 |
| 3,169,183 | 2/1965 | Radtke et al. | 219/121 |
| 3,383,491 | 5/1968 | Muncheryan | 219/121 |
| 3,485,996 | 12/1969 | Chiou et al. | 219/121 |

FOREIGN PATENTS

| 6,607,025 | 5/1966 | Netherlands | 219/121 |

*Primary Examiner* — J. V. Fruhe
*Assistant Examiner* — Lawrence A. Rouse
*Attorneys* — S. A. Giarratana and S. M. Bender

ABSTRACT: A system for correcting unbalances on a rotating mass, in which a laser is directed towards the rotating mass and is adapted to burn off a portion of the mass during its rotation. An electronic control device is connected to the laser for receiving unbalance information, comparing same with a reference point on the mass and firing the laser accordingly.

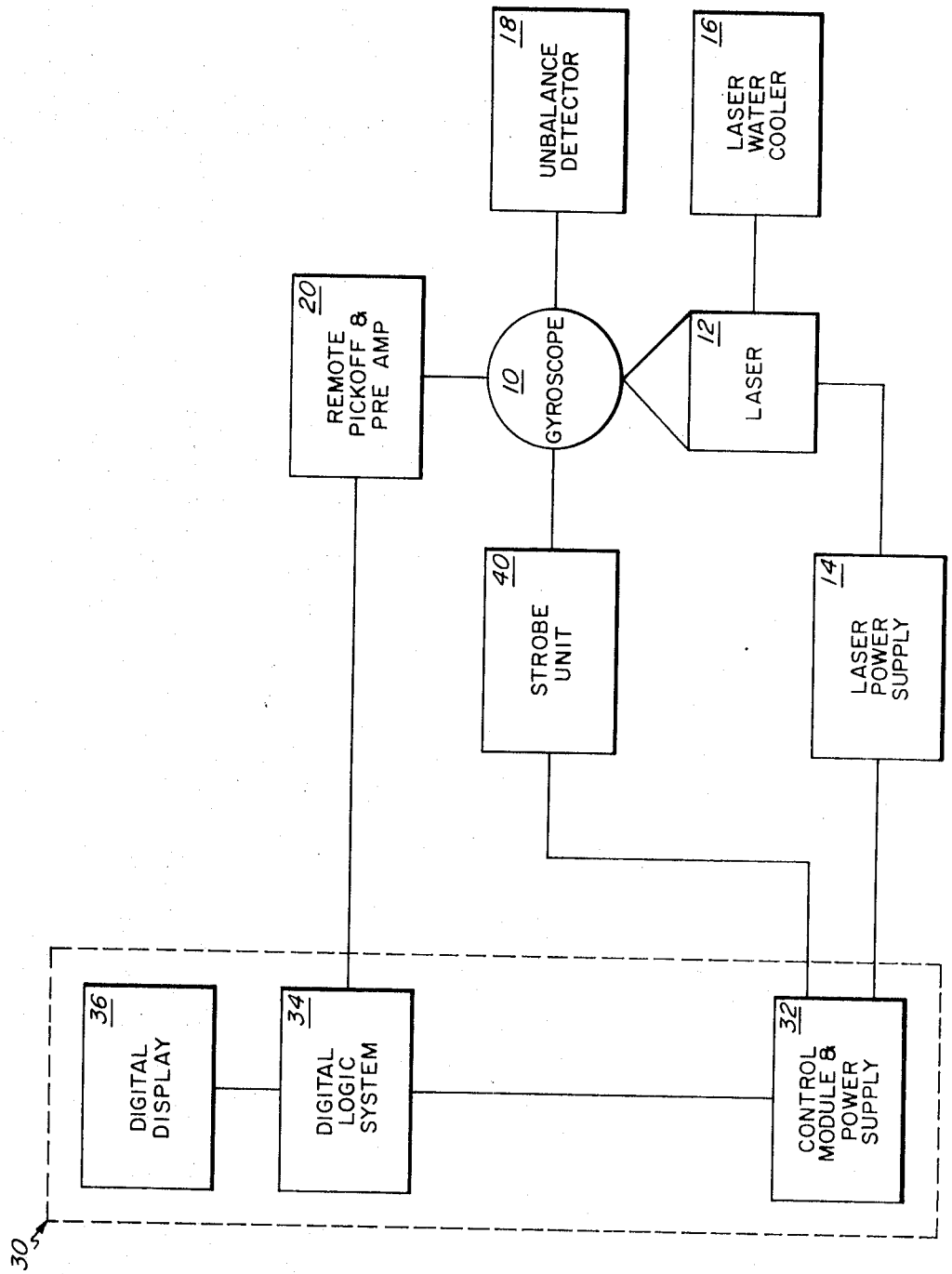
INVENTOR.
WILLIAM ROLFF
BY
ATTORNEYS

SYSTEM FOR CORRECTING UNBALANCES ON A ROTATING MASS

BACKGROUND OF THE INVENTION

This invention relates to a system for correcting unbalances on a rotating mass, and, more particularly, to such a system in which a controlled amount of material is removed from a rotating mass.

The most common procedure for balancing rotating masses such as wheels, etc., generally consists of physically drilling into the wheel, positioning an auxiliary mass or the like around an axis of the wheel, or in some way removing, adding or shifting weight around the wheel to produce a balanced condition. This requires running the wheel at a predetermined speed while measuring the unbalance, stopping the wheel, adjusting the mass around the wheel, and repeating the process until the desired balance is achieved. It is apparent that the time involved in this trial and error procedure is prohibitive to many applications.

SUMMARY OF THE INVENTION

It is therefore an object of the present invention to provide a system for correcting unbalances on a rotating mass which does not require the rotation of the mass to be terminated, and which eliminates the above-mentioned trial and error procedure.

Briefly summarized, the apparatus of the present invention comprises a laser directed towards the rotating mass and adapted to burn off a portion of said mass during rotation thereof; and control means connected to said laser for receiving unbalance information, comparing same with a reference point and firing said laser accordingly.

BRIEF DESCRIPTION OF THE DRAWING

Reference is now made to the accompanying drawing for a better understanding of the nature and object of the apparatus of the present invention, which drawing illustrates the best mode presently contemplated for carrying out the objects of the invention and its principles, and are not to be construed as restrictions or limitations on its scope. The drawing is a block diagram showing the arrangement of the present invention.

DESCRIPTION OF THE PREFERRED EMBODIMENTS

The system of the present invention is depicted in the block diagram of the drawing and will be described in connection with correcting for unbalances in the rotating portion, or wheel, of a gyroscope, it being understood that any other type of rotating mass may also be so corrected. The gyroscope is shown by the reference numeral 10, and the head of a laser 12 is positioned in the immediate vicinity to the gyroscope and directed towards a portion of the wheel, preferably near the outer periphery thereof. The laser is driven by a power supply 14, is cooled by a water cooler system 16, and may be of a known type that will emit a beam that will physically burn off a portion of the wheel during its rotation, as will be described in detail later.

An unbalance detector 18 is provided for the rotating wheel, and may be in the form of one or more units adapted to detect modulation, radial, and mass unbalances and provide a corresponding output signal. In the case of a gyroscope, the detector 18 may be in the form of one or more standard pickoffs commonly used with gyroscopes.

A remote pickoff and preamp 20 is provided in connection with the gyroscope and may be in the form of a photocell which is used to determine a precise angular position on the wheel, which position is used as a reference for indexing any other unbalanced positions of the wheel, as will be apparent from the following.

An electronic control unit is shown in general by the reference numeral 30, and consists of a control module and power supply 32 which is connected to the laser power supply 14 to control the firing of the laser, and which contains the necessary switches and controls to provide the operator of the system with a variety of position functions. This unit also contains the necessary power supplies for the various other units in the system.

The electronic control unit 30 also includes a digital logic system 34 connected to the control module 32 to store information and provide the logic requirements of the system, such as the angular position of the wheel, the fire command, etc. The logic system 34 may be of a known type, such as the type utilizing a plurality of plug-in cards.

The logic system 34 is connected to the remote pickoff and preamp 20 in order to receive and store information relating to the reference angular position of the wheel, it being understood that in the event it is desired to switch the pickoff and preamp 20 to and from a connection with the digital-logic system 34, the former will be connected to the control module 32. The digital-logic system 34 is also adapted to receive and store information based on the unbalance of the wheel, which information may be read from the unbalance detector 18 and dialed into the system by an operator by means of decade switches, or the like.

A digital display 36 is connected to the digital-logic system 34 and provides a visual multicolumn numerical display showing, for example, the total amount of times a fire command was issued, the position of each fire command, a ready to fire indicator, etc.

A standard commercial strobe unit 40 for the gyroscope 10 is provided to enable the wheel of the gyroscope to be visually inspected during its rotation, in a known manner. The strobe unit is adapted to be switched in and out of the system via the control module 32.

In operation, the gyroscope wheel is rotated at a predetermined speed with a separate power supply (not shown) and any unbalance is detected by the detector 18. The angular unbalanced position is noted by the operator, and dialed into the digital logic system 34, whereby it is stored and compared with the angular reference point on the wheel provided by the remote pickoff and preamp 20. The digital-logic system will then issue a fire command to the control module and power supply 32 based on the relative angular position of the unbalance, and the latter will, in turn, fire the laser 12 and burn off a portion of the mass of the wheel in synchronism with its rotation.

The accuracy of the angular position of the wheel determined by the system of the present invention may be as low as one-half of 1° from 0° to 360°, this accuracy being assured by using a digital countdown derived, for example, from a crystal oscillator with an accuracy of 0.001 percent.

In the event of a modulation unbalance, it is desirable to compensate for any resulting radial unbalances caused by burning off a portion of the rotating portion of the gyroscope, by firing the laser and burning a point diametrically opposed the point of the initial burn. In this case the control unit 30 would include more than one channel to enable the laser to fire in response to signals from two separate sources.

A built-in delay circuit may be provided in connection with the firing of the laser in order to effect a predetermined delay between each fire command, if the type of laser so dictates.

It can be appreciated that the digital logic system can be programmed to control the firing of the laser in many different manners. For example, it can automatically slow down the firing of the laser at a preselected count, or shut down the firing either automatically or by manual commands, etc.

It is thus seen that the system of the present invention can correct any type of unbalance of a rotating mass without any loss of time, and without stopping rotation of the mass.

It can be appreciated that some variations of the type and arrangement of the components utilized in the present invention may be made without departing from the scope of the invention. For example, an analog-positioning system may be utilized in place of the digital system in order to provide the commands to fire the laser. This and other variations can be made by those skilled in the art without departing from the invention as defined in the appended claims.

I claim:

1. Apparatus for correcting unbalances on a rotating mass, said apparatus comprising a laser directed towards said rotating mass and adapted to burn off a portion of said mass during rotation thereof, detection means for detecting said unbalances for providing unbalance information, photocell pickoff means to establish and sense a reference point on said rotating mass for providing reference point information, a digital-logic system connected to said detection means for receiving the unbalance information and connected to said pickoff means for receiving the reference point information, a control module connected to said digital-logic system and connected to said laser for receiving the control information and for firing said laser accordingly, a visual digital display connected to and controlled by said digital-logic system, and a strobe unit connected to and controlled by said digital logic system for visually inspecting said rotating mass.

2. The apparatus of claim 1, wherein said digital-logic system includes a plurality of decade switches.

* * * * *

PO-1050
(5/69)

UNITED STATES PATENT OFFICE
CERTIFICATE OF CORRECTION

Patent No. 3,621,180              Dated    11/16/71

Inventor(s)   William Rolff

It is certified that error appears in the above-identified patent and that said Letters Patent are hereby corrected as shown below:

Please change Assignee from

Singer-General Precision, Inc.

TO

The Singer Company

Signed and sealed this 23rd day of May 1972.

(SEAL)
Attest:

EDWARD M. FLETCHER, JR.
Attesting Officer

ROBERT GOTTSCHALK
Commissioner of Patents